UNITED STATES PATENT OFFICE.

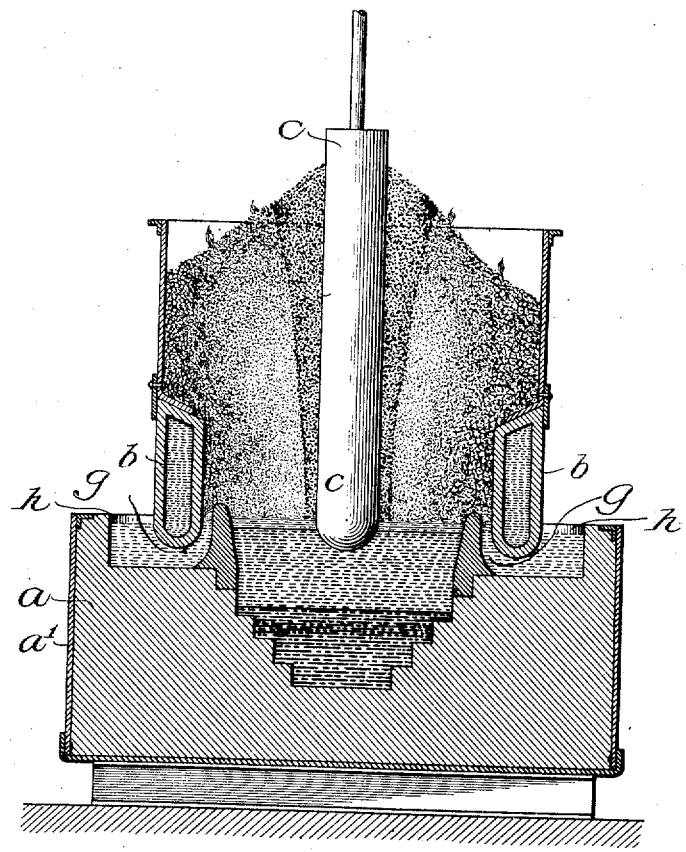

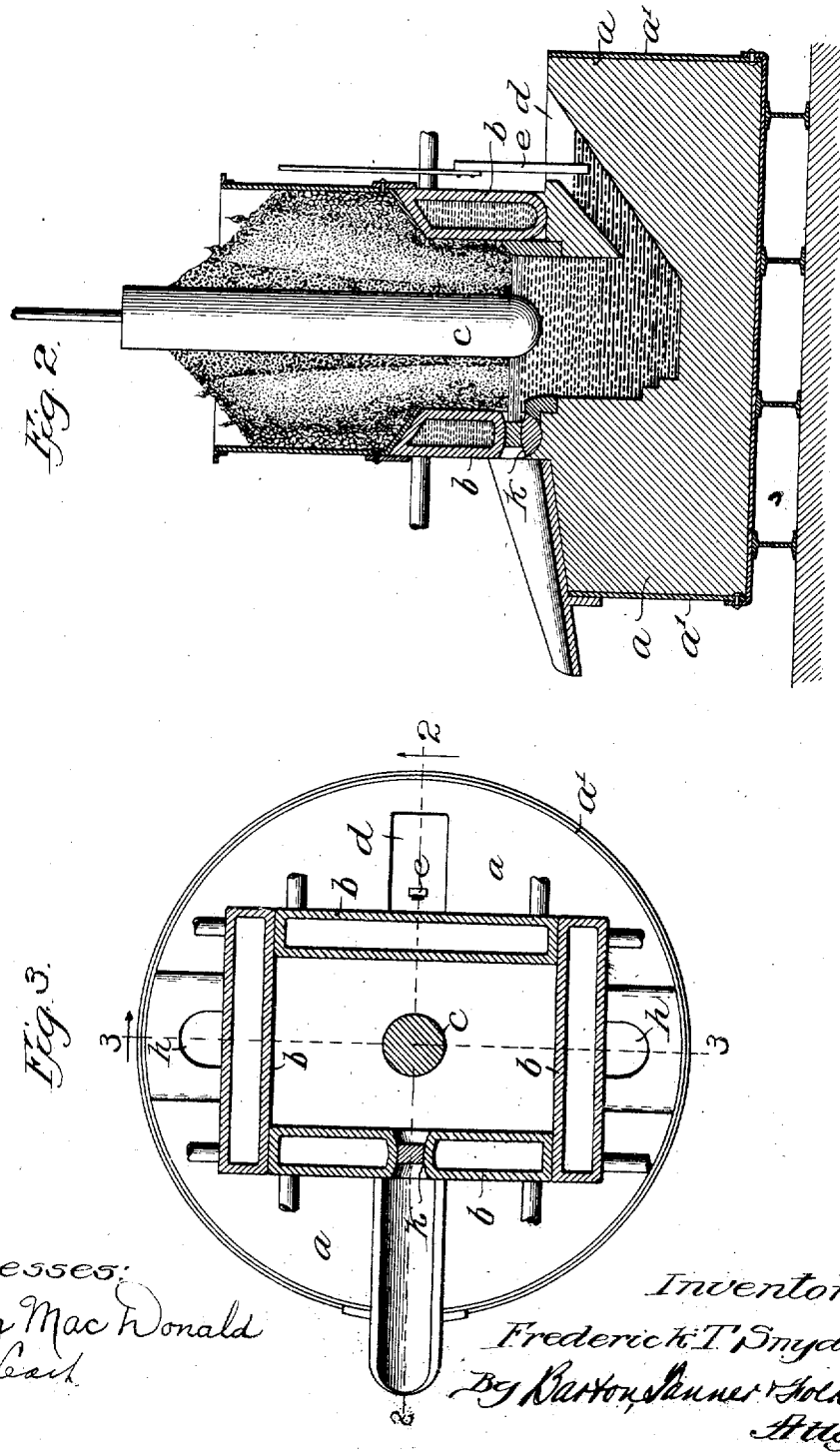

FREDERICK T. SNYDER, OF OAK PARK, ILLINOIS, ASSIGNOR TO ELECTRIC METALS COMPANY, OF CHICAGO, ILLINOIS, A CORPORATION OF WEST VIRGINIA.

SMELTING PROCESS.

No. 859,132.  Specification of Letters Patent.  Patented July 2, 1907.

Application filed June 11, 1906. Serial No. 321,159.

*To all whom it may concern:*

Be it known that I, FREDERICK T. SNYDER, a citizen of the United States, residing at Oak Park, in the county of Cook and State of Illinois, have invented a certain new and useful Improvement in Smelting Processes, of which the following is a full, clear, concise, and exact description.

My invention relates to a smelting process, and is intended more particularly for the treatment of ores containing a compound of a metal which is volatile at reduction. For example, my process will be especially useful in the treatment of zinc ores, and in connection with such ores an object of this invention is to produce spelter as a direct product of the smelting operation, instead of zinc dust.

The present commercial method of treating zinc ores involves the distillation of the ore with carbon in retorts, by means of external heat. This operation takes place in two stages, that is to say, the first stage is characterized by the production of considerable volumes of CO gas containing little zinc, after which a stage occurs in which the CO gas contains a relatively large amount of zinc. In the earlier stage the product is mostly zinc dust, while liquid zinc is obtained during the later stage. This method is generally conceded to be a wasteful metallurgical operation, due to the excessive fuel consumption, the destruction of the retorts by corrosive slags, and the loss of zinc. The method, furthermore, is not a continuous one, and only a small quantity of ore is treated at a time in a retort.

Attempts have been made to smelt zinc ores electrically, in a continuous operation, but heretofore it has been difficult, if not impossible, to produce any considerable proportion of the zinc in liquid or compact form as a direct product of the smelting operation, because the zinc vapor produced has been diluted with such quantities of CO gas and other impurities that it would not condense in liquid form, but would be wholly or in large part in the form of zinc dust, or so-called "blue powder." It has also been proposed to smelt zinc ores in a blast furnace under very high pressure, in order to prevent the zinc vaporizing at reduction. This process, however, involves many mechanical difficulties and the expenditure of great energy in forcing the blast into the furnace against the high internal pressure.

In another application, Serial No. 323,211, filed June 25, 1906, I have described a process of treating zinc ore which involves the heating of separate charges of such ore in successive stages, each charge being subjected first to a heat sufficient to reduce the zinc and liberate the CO gas, while the free surface of the charge from which the CO is given off is kept sufficiently cool to condense the zinc vapor and prevent its escape, after which the entire charge is subjected to a succeeding stage of heat sufficient to fuse the residues to a slag and liberate the metal as vapor, which is thus given off separately in point of time from the CO, so as not to be unduly diluted thereby. In the specific process of this application the material of the charge goes through the successive stages of heating as a result of progressively advancing the charge toward the source of heat, each given portion of the charge being subjected to the different stages of heat at successive places reached in its advance, and also of course at the successive intervals of time required for such advance. The zinc vapor which is being continuously liberated at the later stages of the advance is therefore collected at a separate place from the CO, which is continuously given off from the free surface of the charge. The process of the present application therefore involves certain features of novelty common to both applications, which it is proposed to claim broadly herein, namely, the removal of the non-metallic gaseous products of reduction through a free surface of the charge which is maintained below the vaporization temperature of the metal, so as to prevent escape of such metal therewith, and the subsequent complete fusing of the residue and liberation of the metal separate, whether in point of time or place, from the gaseous products given off at the preceding stage. By thus separately condensing the metallic vapor after most of the diluting gases have been removed, it is possible to obtain practically the entire metallic product in coherent liquid form, as spelter, rather than in the form of dust.

This process will be particularly advantageous in treating low grade zinc ores, or ores containing considerable quantities of lead or copper or slag-forming material which cannot be profitably treated by the methods now in use. The lead as it is reduced may be collected in a body under the bath of molten slag and the copper collected in a matte.

In the accompanying drawings I have illustrated one of the several forms of electric furnaces which may be employed in carrying out my improved process.

Figure 1 is a vertical sectional elevation of the furnace on line 1—1 of Fig. 3; Fig. 2 is a sectional elevation on line 2—2 of Fig. 3; Fig. 3 is a sectional plan view on line 3—3 of Fig. 1.

The same letters of reference are used to designate the same parts wherever they are shown.

The furnace shown in the drawings consists of a crucible *a* of fire brick which may be supported in a circular iron casing $a^1$, as shown, and this crucible is surmounted by a furnace chamber, the lower side walls *b* whereof are made of hollow iron jackets through which a flow of water is maintained. Above the water chambers the side walls of the furnace are continued to form a chute or stack which is merely a box to receive the furnace charge. Through the center of the stack a carbon electrode $c$ extends downward to about the level of the top of the crucible $a$ to make contact with the molten slag in the furnace. The bottom of the crucible is filled with molten lead, forming the other electrode. A lead well $d$ leads outward from the bottom of the crucible to a point outside the furnace walls, and an electric conductor $e$ dipping into the molten metal in the lead well $d$ serves to complete the circuit through the furnace from the carbon electrode $c$. The slag immediately in the vicinity of the electrode $c$ is molten, but toward the walls of the furnace it is cooler, and on the walls is congealed to form a lining therefor, this lining being self-renewing, and being kept from melting by the water jackets.

The furnace chamber is preferably rectangular in form, as shown in Fig. 3, so that the end walls will be at a greater distance from the electrode than the side walls. I also preferably maintain a greater volume of water flowing through the end walls; the result being that there is a greater tendency for the zinc vapor to condense at the ends of the furnace than near the sides within the zone of maximum heat. Passages $g$ $g$ are provided underneath the end walls, communicating with wells $h$ $h$ opening outside of the furnace, these passages serving to drain off and collect the liquid zinc which has condensed inside the furnace.

The furnace charge is fed in at the top, a layer of carbon being preferably filled in surrounding the electrode and the charge heaped up in the center, so as to form an incline down which the larger pieces will tend to roll, the result being to have the body of material in the furnace more porous toward the outside to facilitate the passage of the gaseous products from the heated zone toward the walls. By feeding the materials of the charge in this way, the coarser particles being toward the outside of the mass, and the comminuted reducing material being fed toward the interior of the mass, the carbon monoxid produced in the interior tends to escape through the more porous material toward the outside, where it will turn to carbon dioxid, taking up oxygen from the ore, and also producing additional heat toward the outer limits of the mass.

I will describe my process particularly in its application to the treatment of zinc-lead ore. Such ores are preferably first roasted down to about 8 per cent in sulfur, and the furnace charge is made up of the roasted ore mixed with carbon in the form of coke, or charcoal, and with fluxes, such as lime and iron (unless already present in the ore in the desired quantities) in such proportions as to form what is known as a "high temperature" slag, that is, a slag which requires a high temperature for its formation. Such a slag will be high in lime and silica, the proportion of silica being 50 per cent or more. This slag is desirable in the smelting of zinc ores because it will not retain any appreciable quantity of zinc. Considering now the treatment of such a mixture of materials in the form of furnace illustrated in the drawing, the charge will be fed into the rectangular stack, being heaped up around the central electrode $c$, so that in general the coarser particles of the charge will roll toward the outside of the mass. Coke is also added around the electrode, as shown. Current being passed through the furnace between the electrode $c$ and the conductor $e$ dipping into the lead well, a zone of maximum heat will be established around the lower end of the electrode which will reduce the materials of the charge, forming gas, slag, matte and metallic zinc, which is liberated in the form of vapor. The lead which is produced sinks to the bottom and adds to the body of molten lead in the crucible, from which it may be ladled out from time to time through the lead well $d$. The slag which is formed is molten in the vicinity of the electrode but around the hollow walls through which the water flows it is congealed to form a lining for said walls. The CO gas which is formed as one of the products of the smelting operation escapes through the ore body to the top, where it may be burned. The conditions are such, however, that the escape of the gaseous products is restricted so that a comparatively high pressure is maintained in the central portion of the ore body. I have found in practice that under such conditions the zinc is condensed in liquid form at the end walls and may be drained off under the walls, where it may be collected, as in the wells $h$. The zinc vapor which is produced, in attempting to escape with the CO gas, becomes condensed in the ore body as the gases leave the central heat zone before reaching the outer surface. Then as the ore is progressively fed toward the heat zone the condensed zinc, which may be in the form of dust, is again brought into the zone of maximum heat and revaporized, the result being that the mixture of gas in the furnace is progressively enriched until the percentage of zinc in the mixture is sufficiently high so that the zinc condenses in liquid form. This liquid zinc collects in the cooler portions of the ore body, which in the furnace illustrated will be at the end walls, and may be drained off under said walls through the passages $g$ into the wells $h$, from which it may be ladled. There will be no appreciable collection of liquid zinc at the walls nearer the electrode, because the zone of high temperature, which is above the boiling point of zinc, extends outward as far as the side walls, and the zinc within this zone is vaporized.

The slag, as it accumulates, may be drawn off through a suitable slag tap $k$. As the body of matte accumulates in the furnace, portions of it will be drawn off from time to time, with the slag, and may be settled out of the slag and recovered.

It will be seen that the process above described produces zinc in liquid form, rather than as zinc dust, partly for the same reasons that liquid zinc is produced in the retort method, that is to say; in the retort method, the whole charge in the retort goes through two stages of operation, during the first stage of which mostly CO gas comes off, so that it is not present to dilute the zinc vapor which is given off during the second stage. In my process the CO gas is separated from the mixture of gases at a different stage of the process in point of movement, as well as in point of time. In other words, as the body of ore is progressively fed toward the source of heat, the temperature gradually increases as the movement progresses, and during the first stage of the movement a considerable proportion of the CO gas escapes through the ore body, but the escape of the zinc gas therewith is prevented, because the temperature of the ore body toward the outer surface is such that the zinc vapor must be condensed before it reaches the surface. Then as the body of material is progressively fed toward the heat, the zinc which has become condensed is again brought into the zone of higher temperature and vaporized. Any escape of zinc in the form of vapor is practically impossible, and the mixture of gases in the furnace therefore becomes finally enriched to such an extent that the zinc as it condenses in the cooler portions of the furnace, will condense in liquid form, and may be drained off. Broadly, therefore, this invention involves heating the mixture to be smelted in successive stages: first, to a temperature sufficient to reduce the compound, removing the non-metallic gaseous products of reduction at this stage through a free surface of the charge, while maintaining such free surface below the vaporization-temperature of the volatile metal, so as to prevent the escape thereof, and then at a subsequent stage subjecting the residue to an increased heat sufficient to fuse the same to slag and liberate said metal as vapor separate from the other gaseous products given off at the preceding stage.

The invention also is characterized by the development of a reducing temperature throughout a limited zone in the interior of a body of material to be smelted withdrawing the non-metallic gaseous products at the outer surface of the body at which a lower temperature is maintained, and withdrawing the metallic vapor at the zone of greater heat.

The process of this invention is also distinguished from other processes of electrical zinc smelting in that the volatile products of smelting cannot easily escape through the packed body of material constituting the charge, so that the gases in the smelting zone are under considerable pressure, which in itself conduces to the production of liquid zinc.

A further broad feature of novelty in my process is that the products which are gaseous at a temperature below the melting point of zinc are withdrawn from the upper part of the charge; the products which are not gaseous at the maximum temperature employed are withdrawn from the lower part of the charge, while the zinc is withdrawn from an intermediate part of the charge in which the heat is produced internally.

It will be apparent that this process besides being especially useful in the treatment of zinc ore, may also be employed for the smelting of ores of other metals which are volatile at the temperature of reduction, and that certain features of invention herein disclosed will be capable of application to cases where all the features may not be employed, and I wish my claims to be understood accordingly. The apparatus which I have illustrated for carrying out the process is made the subject-matter of a separate application for Letters Patent, Serial No. 322,140, filed June 18 1906. I also wish to refer to my application, Serial No. 324,116, filed June 30, 1906, in which are claimed certain features which are disclosed in the present application but not claimed herein.

I claim:

1. The process of smelting materials containing a compound of a metal which is volatile at the temperature of reduction, which consists in progressively feeding such materials toward a source of heat, continuously removing the non-metallic gaseous products from the surface of the charge, while preventing the escape of the volatile metal therewith, progressively advancing the residue toward the heat and thereafter separately removing the volatile metal at a further stage of the movement.

2. The process of smelting material containing a compound of a metal volatile at the temperature of reduction, which consists in mixing the material with a reducing agent, heating the mixture internally by electricity and producing volatilized metal, a gaseous compound of the reducing agent and a fused residue, removing the gaseous compound through a portion of the surface of the mixture, cooling another portion of the surface of the mixture to condense the volatilized metal to liquid, and withdrawing the fused residue from a third portion of the surface of the mixture.

3. The process of smelting material containing zinc which consists in heating a charge containing such material internally by means of electricity, continuously withdrawing from the upper part of the charge the products which are gaseous at a temperature below the melting point of zinc, withdrawing from the lower part of the charge the products which are not gaseous at the temperature of the heating, and withdrawing the zinc from an intermediate part of the charge.

4. The process of smelting ore containing zinc which consists in forming a charge by mixing the ore with coke and lime, heating the charge internally by electricity and producing zinc, carbon monoxid and slag, allowing the carbon monoxid to escape through the top of the charge, allowing the zinc to escape through the sides of the charge and allowing the slag to escape from the bottom of the charge.

5. The process of smelting materials containing zinc which consists in progressively moving a charge containing such material toward a source of heat, continuously removing the non-metallic gaseous products at one place in such movement, continuing the movement and removing the zinc at a subsequent place, further continuing the movement and fusing the residues at a third place in such movement.

6. The process of smelting ore containing zinc which consists in internally heating the ore mixed with carbon and lime by means of electricity, producing gaseous zinc, while maintaining in the ore mixture a pressure substantially above atmospheric pressure, removing the non-metallic gaseous products of reduction through a free surface of the ore mixture, while maintaining said free surface below the vaporization temperature of zinc, and separately withdrawing and condensing the volatilized zinc.

7. The continuous process of treating zinc ore which consists in mixing said ore with carbon and fluxes, feeding a charge of such mixture downward in a column, maintaining a temperature sufficient for reduction in the lower portion of said column, withdrawing the non-metallic gaseous products from the cool upper surface of said column, fusing the residues at the bottom, and withdrawing the zinc at the side of the column under a pressure greater than atmospheric pressure.

8. The continuous process of smelting ore containing zinc oxid which consists in mixing such ore with coke, charging the mixture into a furnace heated internally by electricity, removing the carbon monoxid gas through the top of the charge, condensing the zinc to liquid in the furnace by cooling the walls of said furnace, fusing the residue of the ore and withdrawing the liquid zinc and the fused residue through the walls of the furnace.

9. The process of treating lead-zinc sulfid ores which consists in subjecting the ore to an oxidizing roast, charging the furnace with roasted ore and with carbon and fluxes adapted to form a slag at a temperature well above the boiling point of zinc, electrically developing heat in a limited zone in the furnace, sufficient to reduce the charge and keep the slag fluid, producing in the furnace slag, matte, metallic lead and a mixture of zinc and carbonic oxid, allowing the carbonic oxid a restricted escape while condensing the zinc mixed therewith, progressively returning said condensed zinc to the zone of maximum heat and revaporizing said zinc, maintaining a flow of cooling fluid around the furnace wall, condensing the zinc vapor thereat in liquid form, and drawing the liquid zinc from said walls and collecting the same.

10. The process of treating zinc ore which consists in feeding such ore with reducing material toward a source of heat adapted to reduce and volatilize the zinc, allowing the carbonic oxid gas to escape through the ore body while maintaining said ore sufficiently cool to condense the zinc gas, progressively feeding the condensed zinc with the ore toward the source of heat and revolatilizing said zinc, whereby the zinc gases inside the furnace are made sufficiently rich in zinc to allow the zinc vapor to condense as a liquid, maintaining a flow of cooling fluid around the furnace to condense the zinc vapor at the walls thereof, and drawing off the liquid zinc from said walls and collecting the same.

11. The process of smelting materials containing a compound of a metal which is volatile at the temperature of reduction, which consists in developing a reducing temperature throughout a limited zone in the interior of a body of such materials, withdrawing the non-metallic gaseous products at the outer surface of the body, maintaining a lower temperature in the body of material near such outer surface so as to condense the metallic vapors which are mixed with said non-metallic gases, before said vapors can escape, progressively feeding the outer material toward the zone of maximum heat, and withdrawing the metallic vapor from said hotter zone and condensing the same in liquid form.

12. The herein described process of zinc smelting which consists in subjecting a mixture containing a compound of zinc and reducing material to sufficient heat to reduce the zinc compound, condensing the gaseous zinc produced on an additional portion of the mixture and removing the other gaseous products of reduction, then subjecting said additional portion of the mixture with its condensed zinc to a reducing heat, whereby a gaseous mixture higher in zinc than from the first reduction is obtained.

13. The process of smelting ores containing zinc which consists in mixing the ore with reducing materials, heating the mixture to reduce and volatilize the zinc, condensing the gaseous zinc on the earthy portions of the ore, then smelting said earthy portions to form a slag, thereby revolatilizing the zinc and condensing the revolatilized zinc.

14. The continuous process of treating zinc ore which consists in feeding said ore with reducing material toward a source of heat in the absence of air, drawing off the carbonic oxid gas through the ore body at a distance from the source of heat, progressively advancing the residue substantially freed from said carbonic oxid toward the place of greater heat, there volatilizing the zinc, condensing the zinc vapor as a liquid at the wall of the furnace and draining off the liquid zinc.

15. The continuous process of treating zinc ore which consists in electrically smelting said ore with carbon on a slag bath in a close vessel, producing additional slag and a gaseous mixture of zinc vapor and carbonic oxid, maintaining in the slag a temperature considerably above the boiling point of zinc, removing the carbon monoxid gas through an opening maintained below the condensation temperature of zinc, whereby the escape of zinc with the carbonic oxid is prevented, and condensing the zinc vapor as a liquid in a portion of the furnace protected from the heat.

16. The process of treating oxidized zinc ore which consists in mixing said ore with carbon and fluxes adapted to form a slag containing fifty per cent or more of silica, smelting the mixture electrically in a close vessel first reducing and volatilizing the zinc and thereafter fusing the residues to form the high-silica slag, the very high temperature required for the formation of such a slag at a given place in the ore body insuring the thorough reduction of the neighboring zinc oxid before it can be taken up by the slag; whereby the yield of metallic zinc is increased.

17. The process of smelting material containing a compound of zinc which consists in mixing such material with reducing and fluxing elements, heating the mixture to a smelting temperature by means of electricity and removing from the furnace the resulting non-metallic gaseous products the zinc and the slag, by means of separate outlets, the slag outlet being maintained at a temperature above the volatilization temperature of zinc, the outlet for the non-metallic gaseous products being maintained at a temperature below the freezing point of zinc and the zinc outlet being maintained at a temperature between the freezing and volatilization temperatures of zinc.

18. The continuous process of treating zinc ore which consists in electrically smelting said ore with carbon in a close vessel, producing a slag and a mixture of zinc vapor and carbonic oxid gas; allowing the carbonic oxid gas to escape through the ore body while maintaining therein a temperature which will permit condensation of the zinc vapor in the mixture, progressively feeding said ore with the condensed zinc toward the source of heat, whereby the zinc is retained in the furnace until the mixed gas therein is sufficiently rich in vaporized zinc to allow the zinc to condense as a liquid, and collecting the liquid zinc in a cooler portion of the furnace chamber.

19. The continuous process of treating oxidized zinc ore, which consists in mixing said ore with carbon and fluxes adapted to form a slag high in silica, feeding a charge of such mixture downward in a column upon a slag bath in a closed furnace, electrically maintaining in the slag a temperature above the boiling point of zinc, removing the non-metallic gaseous products from the top of the charge while maintaining the upper portion of said charge sufficiently cool to condense any zinc vapor therein, progressively advancing the residues containing the zinc and fusing them on said slag bath, liberating the zinc in said residues as vapor, condensing said zinc vapor as a liquid at the walls of the furnace under a pressure considerably greater than atmospheric pressure, and draining off the liquid zinc.

20. The process of smelting material containing a compound of a metal volatile at reduction, which consists in mixing said material with a reducing agent and with fluxes, heating a charge of such mixture in successive stages, first subjecting said mixture to a heat sufficient to reduce said compound, removing the non-metallic gaseous products of reduction at this stage through a free surface of the charge while maintaining said free surface below the vaporization temperature of the metal, then at a subsequent stage subjecting the residue to an increased heat sufficient to fuse the same to a slag and vaporize said metal, and separately collecting the vaporized metal liberated at such subsequent stage.

21. The process of treating material containing compounds of a metal which is volatile at reduction, which consists in mixing the material with a reducing agent, heating a charge of such mixture to reduce the compound, while maintaining a free surface of said charge below the vaporization temperature of the metal, then fusing the residue of the charge and heating the resulting slag to release such condensed metal.

22. The process of smelting material containing a compound of a metal which is volatile at the temperature of reduction, which consists in feeding a charge of such material mixed with reducing agents, toward a source of heat, removing the gaseous compounds of the reducing agent from the free surface of the charge, maintaining said free surface sufficiently cool to condense the volatile metal within the charge and separate it from said gaseous compounds, progressively advancing the residue of the charge to a place of greater heat, there liberating said volatile metal as a gas, largely freed from diluting gases, and separately removing such volatile metal.

23. The continuous process of smelting ore containing zinc oxid which consists in mixing the ore with carbonaceous material, charging the mixture into a furnace heated internally by electricity, removing carbon monoxid gas through the charge, condensing the gaseous zinc on the interior walls of the furnace, and removing the resulting coherent zinc through an aperture in the furnace.

24. A process of treating ores in which the crushed ore is fed toward a source of heat in an electric furnace, the coarser particles of ore being fed toward the outside of the mass, and comminuted reducing material being fed toward the interior of the mass, whereby the carbon monoxid produced in the interior tends to escape through the more porous material toward the outside, where it will burn to carbon dioxid, taking up oxygen from the ore and reducing the same, and producing additional heat toward the outside of the mass.

25. A process of smelting ores of zinc and similar volatile metals, which consists in heating a charge of such ore with a reducing agent, producing vaporized metal and a gaseous compound of the reducing agent, allowing said gaseous compound to escape while retaining and condensing said vaporized metal in the furnace, and removing said condensed metal through a separate opening.

26. A process of smelting ores of zinc and similar volatile metals which consists in heating such ore with a reducing agent, producing vaporized metal and a gaseous compound of the reducing agent, separating said gaseous compound from the metallic product in the reducing furnace, and separately removing said compound through one opening and the metallic product through another opening.

27. The process of treating ores of zinc and similar volatile metals which consists in heating the ore with reducing and fluxing agents to a temperature sufficient to partially reduce the ore and drive off a large proportion of the gaseous product of the reducing agent while maintaining the free surface of the charge at a temperature sufficiently low to prevent the escape of any substantial amount of metallic vapor, and subsequently heating the residues to a degree sufficient to liberate the metal, whereby the metal may be recovered in coherent form.

In witness whereof, I, hereunto subscribe my name this seventh day of June, A. D., 1906.

FREDERICK T. SNYDER.

Witnesses:
D. C. TANNER,
ALFRED H. MOORE.